(12) United States Patent
Miller et al.

(10) Patent No.: US 9,649,874 B2
(45) Date of Patent: May 16, 2017

(54) FOIL STAMPING MACHINE

(71) Applicant: Yakov Miller, Jerusalem (IL)

(72) Inventors: Yakov Miller, Jerusalem (IL); Yair Adar, Kvutzat Yavne (IL)

( * ) Notice: Subject to any disclaimer, the term of this patent is extended or adjusted under 35 U.S.C. 154(b) by 0 days.

(21) Appl. No.: 14/893,083

(22) PCT Filed: May 29, 2014

(86) PCT No.: PCT/IB2014/061808
§ 371 (c)(1),
(2) Date: Nov. 23, 2015

(87) PCT Pub. No.: WO2014/195833
PCT Pub. Date: Dec. 11, 2014

(65) Prior Publication Data
US 2016/0089928 A1  Mar. 31, 2016

(30) Foreign Application Priority Data
Jun. 6, 2013  (GB) .................................. 1310073.0

(51) Int. Cl.
*B44B 5/00* (2006.01)
*B44B 5/02* (2006.01)
(Continued)

(52) U.S. Cl.
CPC .......... *B44B 5/028* (2013.01); *B41F 16/0046* (2013.01); *B41F 19/068* (2013.01);
(Continued)

(58) Field of Classification Search
CPC ..... B44B 5/009; B44B 5/0019; B44B 5/0071; B44B 5/028; B44B 5/0095; B41F 16/0046; B41F 19/068; H04N 5/225; H04N 5/2256
See application file for complete search history.

(56) References Cited

U.S. PATENT DOCUMENTS 4,930,911 A * 6/1990 Sampson ................... B41J 3/28
101/27
5,396,279 A  3/1995 Vossen
(Continued)

FOREIGN PATENT DOCUMENTS

DE  19631506  *  2/1998  .......... B23Q 11/100
EP  0921952 B1  6/1999
(Continued)

OTHER PUBLICATIONS

United Kingdom Intellectual Property Office, Combined Search and Examination Report under Sections 17&18(3), Dec. 6, 2013, App No. GB1310073.0.

(Continued)

*Primary Examiner* — Blake A Tankersley
*Assistant Examiner* — Marissa Ferguson Samreth
(74) *Attorney, Agent, or Firm* — Dr. Hanan Farber Patent Agent Ltd

(57) ABSTRACT

A stamping machine is configured for stamping with a stamping head onto an article, The stamping machine includes a camera and a computer system. The computer system includes a display. The computer system is configured to capture from the camera an image of the article prior to the stamping and presents the image on the display. A user selects a symbol using the computer system prior to the stamping onto the article. The user using the computer system, positions the selected symbol as a displayed symbol superimposed on the image of the article.

15 Claims, 6 Drawing Sheets

(51) Int. Cl.
 *B41F 16/00* (2006.01)
 *B41F 19/06* (2006.01)
 *H04N 5/225* (2006.01)

(52) U.S. Cl.
 CPC .......... *B44B 5/0009* (2013.01); *B44B 5/0019* (2013.01); *B44B 5/0071* (2013.01); *B44B 5/0095* (2013.01); *H04N 5/225* (2013.01); *H04N 5/2256* (2013.01)

(56) References Cited

U.S. PATENT DOCUMENTS

| | | | |
|---|---|---|---|
| 6,066,829 A | 5/2000 | Ishikawa | |
| 2007/0277357 A1* | 12/2007 | Meyer | B24B 13/046 29/27 C |

FOREIGN PATENT DOCUMENTS

| | | |
|---|---|---|
| EP | 0958881 A1 | 11/1999 |
| GB | 221061 A | 1/1990 |
| WO | 2008117327 A2 | 10/2008 |
| ZA | 9706708 A | 2/1998 |

OTHER PUBLICATIONS

United Kingdom Intellectual Property Office, Combined Search and Examination Report under Section 18(3), Sep. 2, 2014, App No. GB1310073.0.
United Kingdom Intellectual Property Office, Letter of Grant, Apr. 14, 2015, App No. GB1310073.0.

* cited by examiner

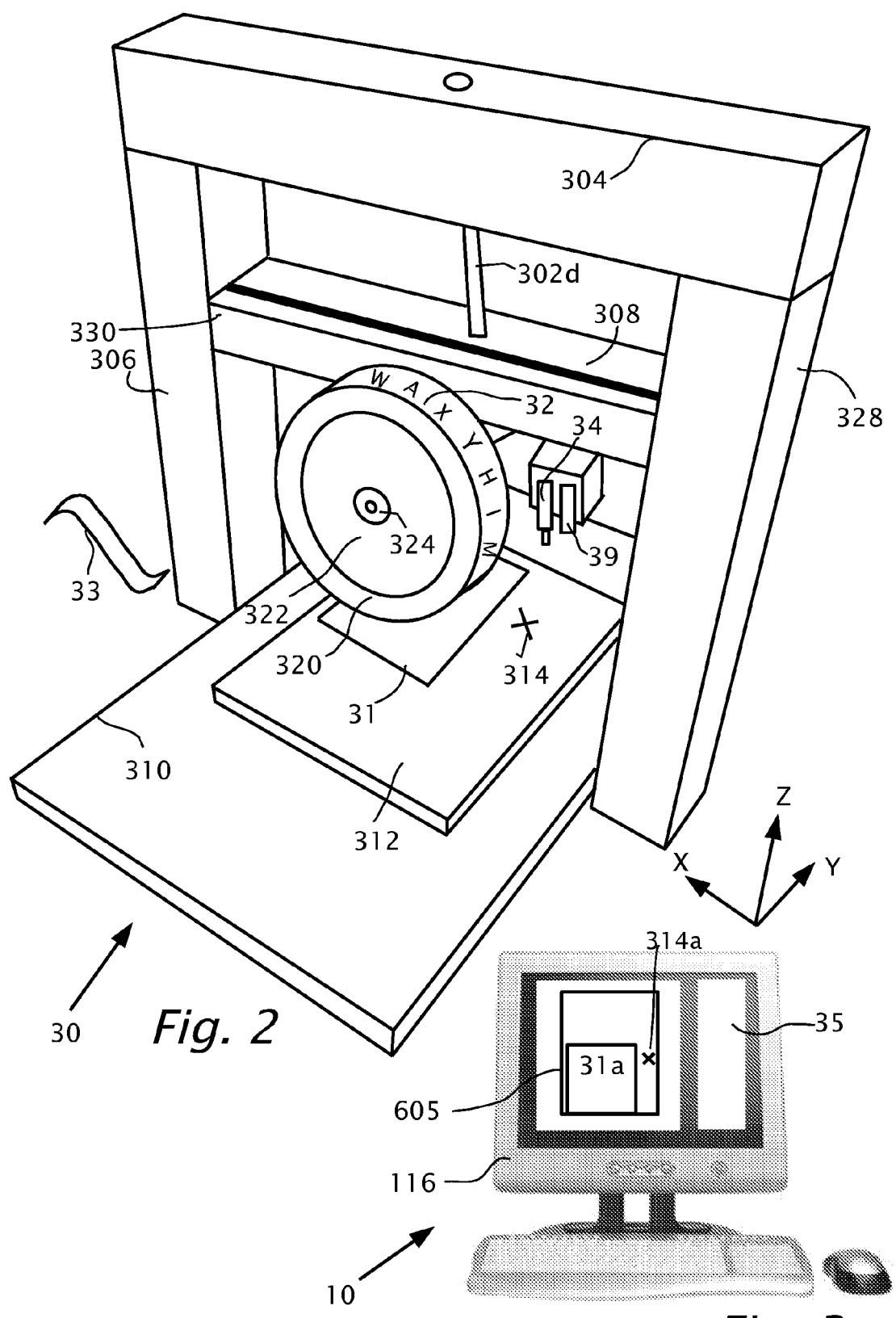

FOIL STAMPING MACHINE

BACKGROUND

1. Technical Field

The present invention relates to a foil stamping machine and method for operating the foil stamping machine.

2. Description of Related Art

Text or decorative patterns may be produced on an article by means of a hot foil stamping machine, in which a foil is pressed between a heated stamping member and the surface of the article.

Hot foil stamping of titles, authors and other information on book bindings is accomplished traditionally by contract binderies and print shops. A series of letters and type fonts are assembled in a jig, either by hand, with the use of an automatic type caster, or by preparing an etched metal die from art work. The completed jig or die is transferred to a printing position where an overall imprint, for example, of the book title, author, report name and number, is simultaneously imprinted on the front and/or spine of the book.

In manual hot foil stamping machines designed for small volumes of for instance 1-100 items, the operator stands above the machine and manually places the article in the correct position and orientation for stamping by viewing the article from above while lowering by means of a lever the stamp die toward the article to be stamped. Normally, a trained operator is required to operate manual foiling stamping machines. Other semi-automated stamping machines, are calibrated by the method of "cut and try" by pre-aligning one or more alignment stops, placing one or more articles to be stamped and repeating the process by continuing to stamp articles until the machine is aligned. Such a calibration method generates production waste which may be justifiable only for high volume.

There is thus a need for a foil stamping machine which does not require a skilled worker for positioning and orienting the articles to be printed and does not generate production waste during calibration.

BRIEF SUMMARY

Various stamping machines are provided for herein configured for stamping with a stamping head onto an article. The stamping machine includes a camera and a computer system. The computer system includes a display. The computer system is configured to capture from the camera an image of the article prior to the stamping and presents the image on the display. A user selects a symbol using the computer system prior to the stamping onto the article. The user using the computer system positions the selected symbol as a displayed symbol superimposed on the image of the article.

The stamping machine may be previously calibrated to perform the stamping positioned on the article in the same position and orientation as the displayed symbol superimposed on the image of the article as presented to the user prior to the stamping.

A work surface may be disposed in a plane. The article prior to stamping is mountable on the work surface. The work surface is laterally movable in the plane. The stamping head may be mountable on at least one rotational axis. Multiple dies in relief are mounted on an external surface of the stamping head. The dies are individually locatable to oppose the article to be stamped when at least one symbol is selected by the user which corresponds to at least one of the dies. A heating element may be disposed within the stamping head operable to heat the stamping head prior to and during the stamping. A distance sensor may be adapted to measure longitudinal distance to a surface of the article and/or the work surface prior to or during the stamping. A laser mounted may be mounted on a fixed cross member adapted to project a line onto the article prior to or during stamping. A holding member may be adapted to hold the article securely against the work surface. An encoder may be attachable to the holding member. The encoder is operable to measure longitudinal distance between the work surface and the upper surface of the article. A mechanism may feed a foil between the article and the stamping head under control of the computer system. The foil may be embedded to a previously determined depth into a surface of the article. The stamping head may be rotatable around a single rotational axis to locate the die to oppose the article to be stamped, and the feed mechanism is configured to feed the foil in a direction parallel to the single rotation axis. Various methods are provided for herein for using a stamping machine including a stamping head, a camera and a computer system. The computer system includes a display. The camera captures an image of the article. The image is presented on the display. A symbol is selected by a user using the computer system for stamping onto the article. The selected symbol is positioned and oriented as a displayed symbol superimposed on the image of the article on the display. The stamping machine is previously calibrated to perform the stamping positioned and oriented on the article in the same position and orientation as the displayed symbol superimposed on the image of the article as presented to the user. The stamping head is mountable on at least one rotational axis. Multiple dies in relief may be disposed on an external surface of the stamping head. Under control of the computer system, at least one of the dies is individually located to oppose the article to be stamped when at least one symbol selected by the user corresponds to at least one of the dies. The stamping head is internally heated during the stamping. The article may be mounted on a work surface disposed in a plane and under control of the computer system, the article may be moved laterally in the plane.

Longitudinal distance may be measured to a surface of the article prior to or during the stamping. A foil may be fed between the article and the stamping head and under control of the computer system, the stamping may be performed by embedding the foil to a previously determined depth into a surface of the article. The stamping head may rotate around a single rotational axis to locate the die to oppose the article to be stamped and the foil may be fed in a direction parallel to the single rotation axis.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein:

FIG. 2 illustrates an isometric perspective drawing showing detail of a foil stamping machine, according to feature of the present invention.

FIG. 3 shows a display of a computer system which is operatively attached to the foil stamping machine, according to a feature of the present invention.

DETAILED DESCRIPTION

Figure 1:
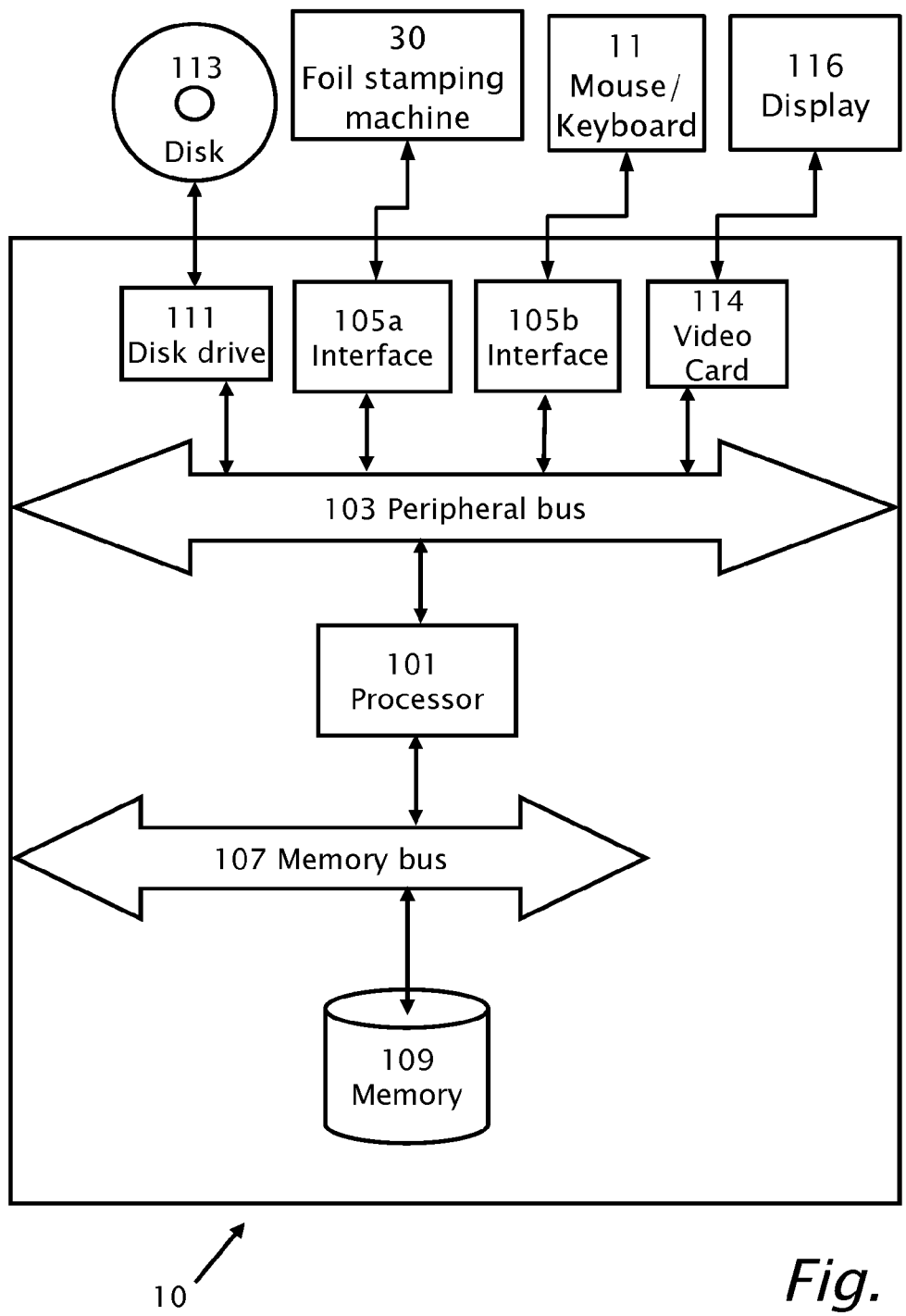
FIG. 1 shows a block diagram of a computer system connected to a foil stamping machine, according to feature of the present invention.

Reference will now be made in detail to features of the present invention, examples of which are illustrated in the accompanying drawings, wherein like reference numerals refer to like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

By way of introduction, various embodiments of the present invention are directed to a foil stamping machine with a computerized visual interface. The visual interface provides accurate placement and orientation of articles to be stamped. The visual interface includes a camera viewing the article to be stamped and a visual display of image frames from the camera. The camera, stamping machine and visual display are connected to and under control of a computer system. The user may select a font for alphanumeric characters or other symbols for stamping, spacing between symbols and depth of stamping using the computer and visual interface.

After a one time calibration, the system provides a "what you see is what you get" (WYSIWYG) visual interface which allows user with minimal training to easily and accurately position symbols of choice to be stamped onto the article by using the computer system and visual interface.

Reference is now made to FIG. 1 which shows a simplified block diagram of a computer system 10 connected to or integrated with a foil stamping machine 30, according to feature of the present invention. Computer system 10 includes a processor 101, a storage mechanism including a memory bus 107 to store information in memory 109 and interfaces 105a and 105b operatively connected to processor 101 with a peripheral bus 103. Foil stamping machine 30 is shown connected bi-directionally to computer system 10 via interface 105a. Computer system 10 further includes a data input mechanism 111, e.g. disk drive for a computer readable medium 113, e.g. optical disk. Data input mechanism 111 is operatively connected to processor 101 with peripheral bus 103. Operatively connected to peripheral bus 103 is video card 114. The output of video card 114 operatively connected to the input of display 116. Human interface 11, e.g. mouse/keyboard are shown connected to interface 105b.

Reference is now made to FIG. 2 which shows an isometric perspective drawing showing detail of foil stamping machine 30, according to aspects of the present invention. A movable working surface 312 is shown mounted on a base 310. Working surface 312 may be moved in the X and Y direction, typically horizontally, by stepper motors (not shown) mechanically attached to lead screws respectively. A stepper motor is an electromagnetic device that converts digital pulses into precise mechanical shaft rotations so as to drive lead screws. The stepper motor may include an indexer or controller which is a microprocessor capable of generating step pulses and direction signals for a driver. The driver (or amplifier) converts the indexer command signals into the power necessary to energize the motor windings of the stepper motor. The stepper motors used to drive lead screws are connected to and/or controlled by a program stored in memory 109 of computer system 10.

Vertical members 306 and 328 are mechanically attached to base 310 and cross members 304 and 330. Cross member 308 is movable in the Z direction, typically vertically, via lead screw 302d and an associated stepper motor (not shown). Attached to a fixed cross member 330 is a camera 34 which provides images of work surface 312. A registration mark 314 is shown engraved or marked on work surface 312. Alternatively, registration mark 314 such as a projected line or cross may be provided on work surface 312 from a laser pointer unit (not shown) mounted on fixed cross member 330. An article 31 to be stamped according to a feature of the present invention is shown mounted on work surface 312. Camera 34 may be a short focus camera with a wide range working distance which connects to computer system 10 so as to provide images of work surface 312, including registration mark 314 and/or article 31. A distance sensor 39, e.g. laser sensor, may also be mounted on fixed cross member 330 which is capable of sensing the distance to work surface 312 and/or article 31. Alternatively, distance to the surface of article 31 to be stamped may be measured relative to the plane of work surface 312 and a distance sensor (not shown) may include a linear encoder incorporated into a member (not shown) which is configured to hold article 31 firmly on work surface 312 prior to stamping.

Foil 33 is shown for inserting between die 320 and article 31 during stamping. According to one aspect of the present invention, foil 33 may be fed along the X axis by a feed mechanism (not shown). In an alternative aspect of the invention, foil 33 is fed along the Y axis by a feed mechanism (not shown), ie. foil 33 is fed in a direction parallel to the rotational axis (Y) of stamping die 320.

A stamping die 320 and a housing 322 on which stamping die 320 is mounted, are rotatable under computer control about a shaft 324 which may be parallel to XY plane in order to select the symbols for stamping. Die 320 is shown with symbols, i.e. alpha numeric characters 32 in relief. Alternatively characters 32 may be photo-lithographic plates which are mountable on die 320. Die 320 may be fabricated from brass or other appropriate metal and/or metallic alloy. Similarly, housing 322 may be fabricated from aluminum or other appropriate metal and/or metal alloy or other thermally conductive material.

Proximity sensors (not shown) may be located to sense the end of respective drive lead screws to serve as safety interlocks.

Reference is now made to FIG. 3 which shows display 116 as part of computer system 10 operatively attached to foil stamping machine 30, according to a feature of the present invention. Display 116 shows a "what you see is what you get" (WYSIWYG) image 605 which includes an image 314a of registration mark 314 and image 31a of article 31 to be stamped. To the right is a menu 35 which includes a one time calibration of the visual interface provided on display 116 which subsequently allows accurate positioning of alphanumeric characters or other symbols of choice to be stamped onto the item 31. Menu 35 additionally allows for a user to set the depth of travel of die 320 and foil 33 into item 31, to set the temperature of die 320, to specify the alphanumeric characters 32 to be embossed onto item 31 as well as the spacing between the alphanumeric characters 32 and/or formatting of the alphanumeric characters 32. An operating temperature for die 320 may be set by computer system 10 or independently from computer system 10. Camera 34 may also be utilized subsequent to a stamping of an article 31 to capture an image of stamped article 31, so as to provide a comparison between the image subsequent to stamping and image 31a on display 116 prior stamping.

Figure 4:
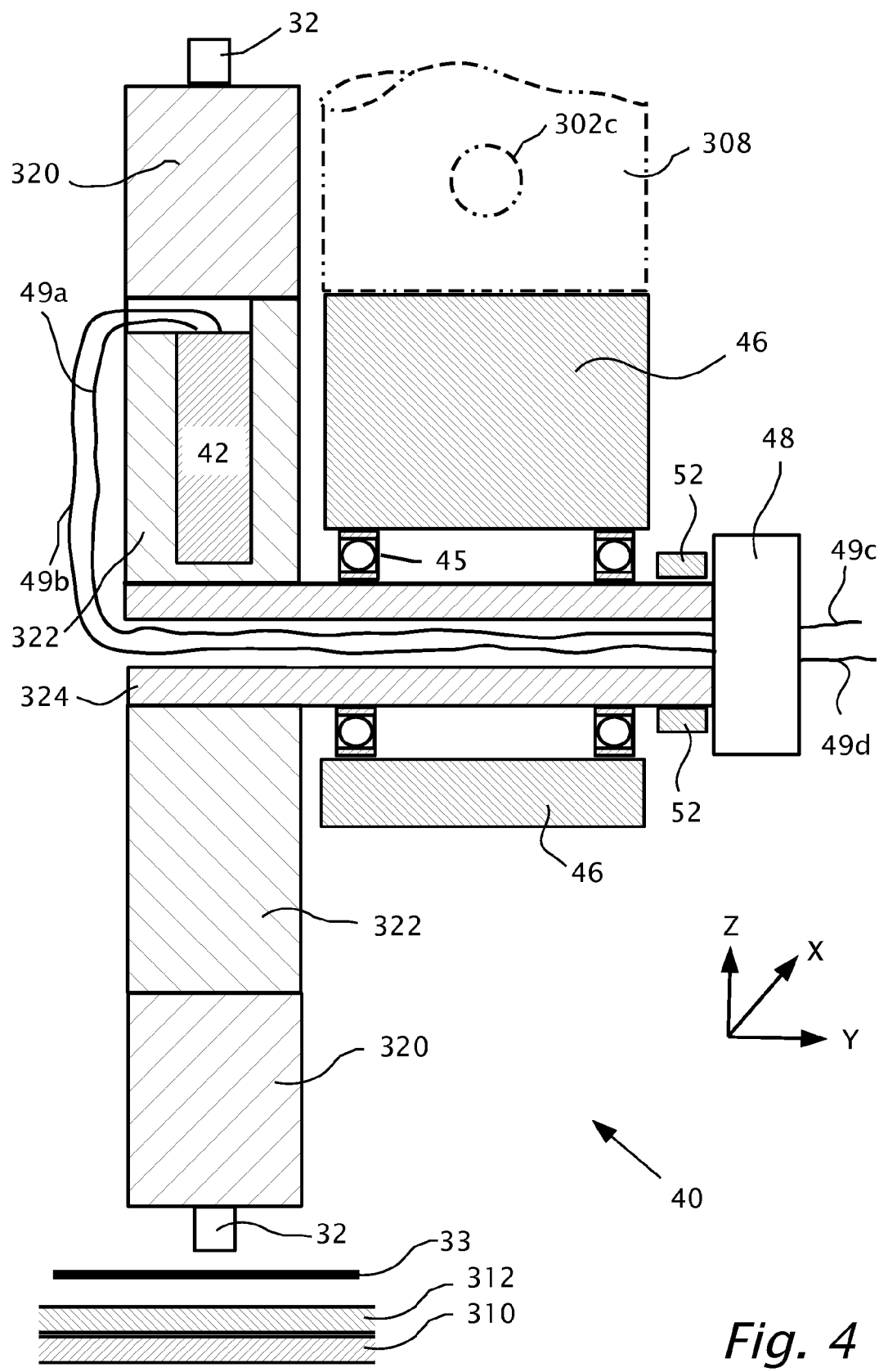
FIG. 4 shows a cross sectional side view which shows greater details of a shaft and a housing mechanically attached to a cross member via a block, according to feature of the present invention.

Reference is now made to FIG. 4 which shows a cross sectional side view 40 showing further details of stamping machine 30. Shaft 324 and housing 322 mechanically attached to cross member 308 via block 46, according to feature of the present invention. Block 46 attached to cross member 308 and is movable linearly in the Z axis direction so as to allow stamping of characters 32 into article 31. The movement of block 46 in the Z axis direction may provided by a linear actuator. The linear actuator converting angular rotation (from a motor) into a linear motion. The linear actuator may be a cam actuator, wheel and axle, screw thread or any linear actuator known in the art. Housing 322 is shown attached to shaft 324 and die attached to housing 322. The removal of die 320 from housing 322 allows a heating element 42 to be located and inserted and/or re-inserted inside housing 322 via an aperture in housing 322. The aperture in housing 322 further allows electrical wires 49a and 49b to be connected to heating element 42. Wires 49a and 49b are passed through the through bore of shaft 324. The other ends of wires 49a and 49b connect to a rotary electrical connector 48 (not shown in cross section). Rotary electrical connector 48 enables electrical power to be supplied to heating element 42 on wires 49c and 49d as shaft 324, housing 322 and die 320 are rotated about shaft 324. Heat from heating element 42 propagates through housing 322 into die 320. A temperature sensor may be located on die 320 which may be wired to a temperature sensor to control the power applied to heating element 42 or the temperature sensor may be connected to computer system 10 so that computer system 10 controls the power applied to heating element 42. Rotational torque to shaft 324 is applied on cam belt 52 from a stepper motor (not shown).

Rotation of shaft 324 is facilitated by bearings 45 which are housed in block 46 which is attached to cross member 308. Block 46 is movable along the X axis via lead screw 302c which is mechanically attached to a stepper motor (not shown).

Figure 4A:
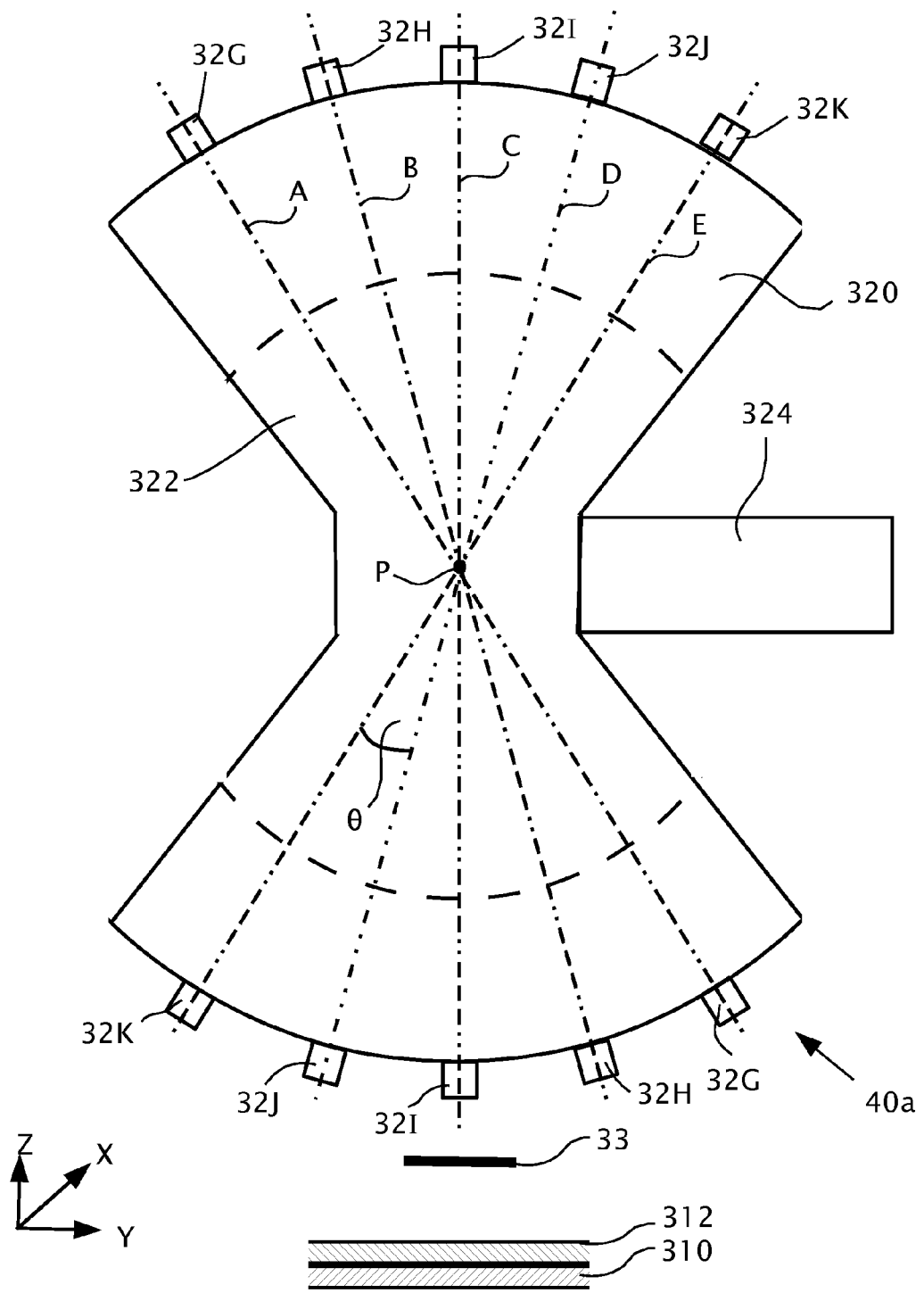
FIG. 4a shows a partial side view of an alternative embodiment for die/housing of a stamping machine, according to a feature of the present invention.

Reference is now made to FIG. 4a which shows a partial side view 40a of an alternative embodiment for die 320/housing 322 of stamping machine 30, according to a feature of the present invention. The alternative embodiment provides for multiple set of characters 32, shown by way of example, is five sets of selectable characters 32G, 32H, 32I, 32J and 32K which have axes G, H, I, J and K respectively. Each of axes G, H, I, J and K of selectable characters 32G, 32H, 32I, 32J and 32K are rotational around axis X at point P by an angle θ so that a selected set of characters 32 is parallel with vertical axis Z. Selection of which particular character 32 for a each of selectable characters 32G, 32H, 32I, 32J and 32K is done by rotation of shaft 324 which rotates around axis Y. Foil 33 may fed in a direction parallel to the rotational axis Y of stamping die 320 or foil 33 may be fed in a direction parallel to the rotational axis X of stamping die 320 so that an article 31 placed on working surface 312/base 310 may be stamped by die 320. A feature of the present invention is that foil 33 fed in a direction parallel to the rotational axis (Y) as opposed to being fed along the X axis, may avoid inadvertent stamping and or marking with foil 33 of characters 32a/32b on either side of character 32 presently being stamped into the surface of an article 31.

A further alternative for die 320/housing 322 is to have a 'golf ball' or other spherical shape, were the surface of the 'golf ball' has multiple characters 32 which may be selectable by movement around point P with respect to rotational axes X, Y and Z. Alternatively shaft 324 may be parallel with the Z axis and similarly multiple characters 32 may be selectable by movement around point P with respect to rotational axes X, Y and Z.

Figure 5:
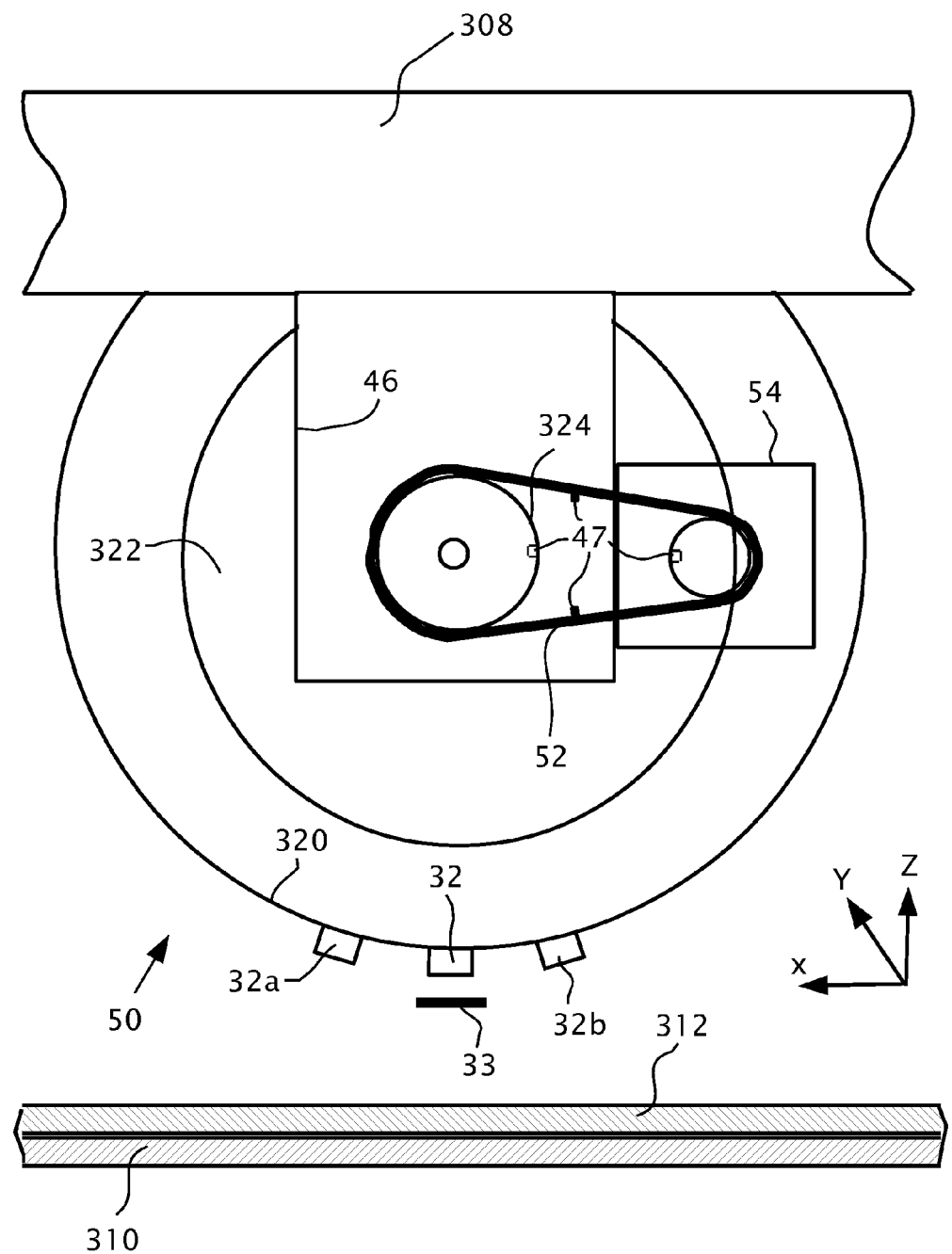
FIG. 5 shows a plan rear view of a foil stamping, according to a feature of the present invention.

Reference is now made to FIG. 5 which shows a plan view 50 of the rear end of stamping machine 30 according to a feature of the present invention. Block 46 is shown attached to cross member 308 which is movable in the Z axis direction. In plan view 50 rotary connector 48 is removed and not shown. Cam belt 52 connects the rotary torque output of stepper motor 54 to shaft 324 via cams 47 (only one is shown for each shaft) on shaft 324 and the shaft of stepper motor 54. The rotation of shaft 324 also rotates housing 322, die 320 and alpha numeric characters 32. Foil 33 is shown fed in a direction parallel to the rotational axis (Y) of stamping die 320.

Figure 6:
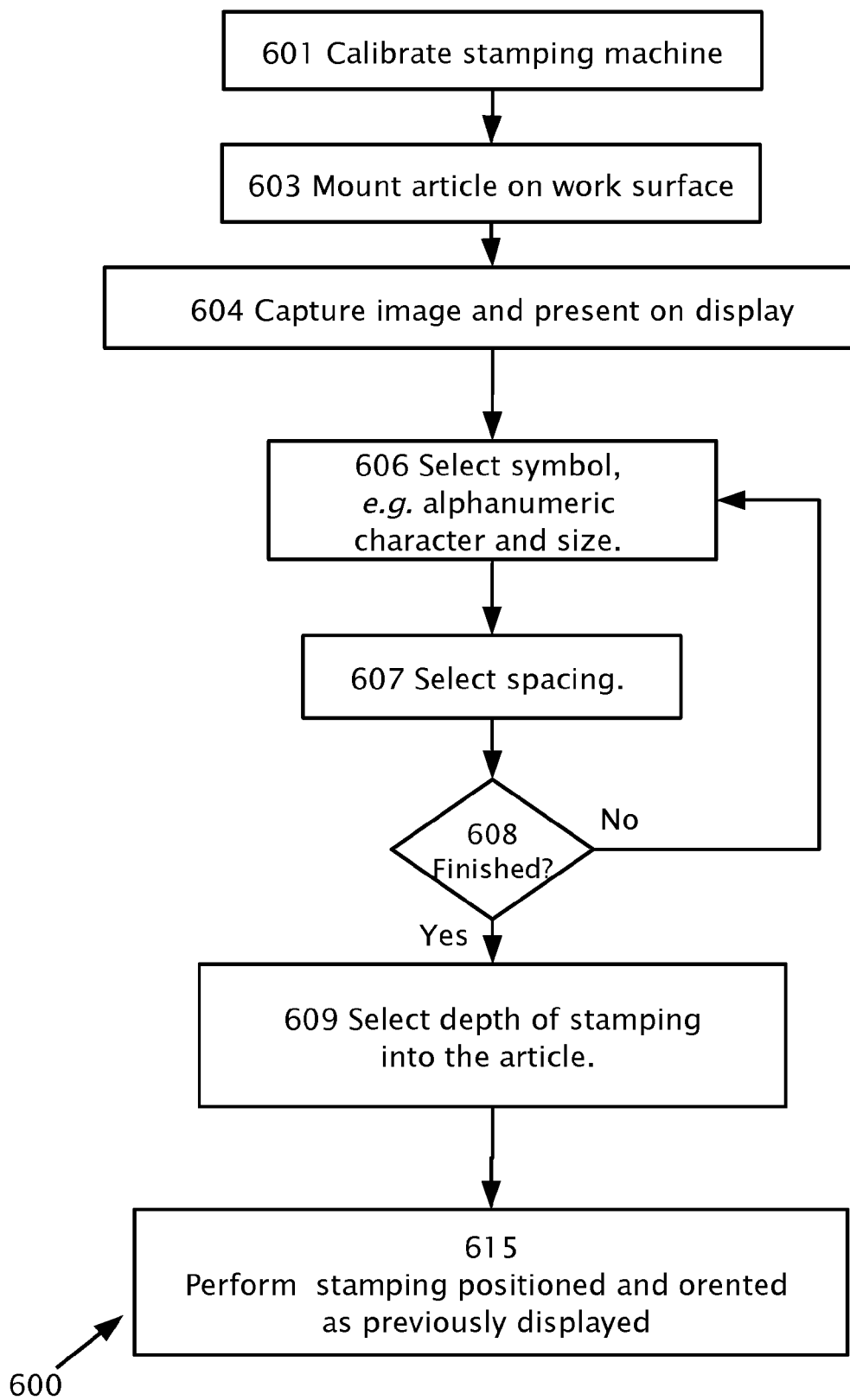
FIG. 6 shows a flow chart for a method, according to a feature of the present invention.

Reference is now made to FIG. 6 which shows flow chart for a method 600, according to a feature of the present invention. Method 600 begins with a a first time calibration of the stamping machine. Calibration 601 includes mapping XY coordinates on work surface 312 to xy coordinates in image space of images of the work surface 312 provided by camera 34. The mapping depends at least implicitly on the position and orientation of camera 34 relative to work surface 312, the focal length of camera 34, and the pixel size and shape of the image sensor in camera 34. Using known methods in the art of image processing, the mapping may be achieved relatively easily and accurately using a number of registration marks 314 and images 314a thereof. The mapping also may remove any intrinsic distortion of camera 34 and distortion due to camera angle, if the optical axis of camera 34 is not normal to work surface 314. Once calibration 601 is performed, the mapping may be used to determine real distances such as dimensions of the fonts used for stamping and the spacing between symbols.

In step 603, article 31 is mounted on work surface 312. Article 31 may be a book cover for example which needs the name of the owner of the book to be stamped onto or into the book cover at a specific location on the book cover. Article 31 to be stamped may be located and secured via a jig onto working surface 312. The jig ensures subsequent correct placement of the similar articles 31 if the same items 31a are to be repeatedly stamped with the same or different sequences and formatting of alpha numeric characters 32.

In step 604, an image of mounted article 31 to be stamped is captured. Computer system 10 prompts the user to select (step 606) the symbol, e,g, font and size of alphanumeric characters. Step 604 may also include prompting the user to change die 320 by removing die 320 from housing 322 so that alphanumeric characters 32 physically correspond with alphanumeric characters 32 selected in step 606.

In step 607, the spacing between alphanumeric characters 32 is also chosen in software.

When the user is finished (decision block 608) selecting symbols, e.g. alphanumeric characters 32, in step 609, a depth of stamping may be selected by the user. The depth may be determined based on the distance to working surface 312 or article 31 measured by sensor 39. In step 615, stamping is performed positioned and oriented as displayed.

In the description that follows an example is to stamp the title for a book onto a book cover previously calibrated by use of the steps of method 601. An alphanumeric character is selected (step 606) as part of a series of alphanumeric characters to be stamped into the book cover. The words of the title are entered into computer system 10. The user is able to see if the letters of the title fit the width of the book cover as well as if the letters are positioned correctly. The user interface of computer system 10 allows for example, the title to be on two lines and centered for example and/or re-positioned. Once the user approves the format and position of the title, the title may be embossed onto the book cover by virtue of control of the stepper motors to embed die 320 and foil 33 at the correct position, orientation, depth into the book cover.

The indefinite articles "a", "an" as used herein, such as "a camera", "an image" has the meaning of "one or more" that is "one or more cameras", "one or more images".

The term "alphanumeric character" as used herein, includes any alphabetic and/or numeric characters.

The term "symbol" as used herein refers to a particular font and size of an alphanumeric character or otherwise artwork or sign which is not necessarily an alphanumeric character.

The term "laterally" as used herein refers to motion in a geometric plane including the surface of the article being stamped Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

The invention claimed is:

1. A stamping machine configured for stamping with a stamping head onto an article, the stamping machine including:
   a camera;
   a computer system; wherein the computer system includes a display, wherein the computer system is configured to capture from the camera an image of the article prior to the stamping and presents the image on the display, wherein a user selects a symbol using the computer system prior to the stamping onto the article, wherein the user using the computer system positions said selected symbol as a displayed symbol superimposed on said image of the article;
   a plurality of dies in relief on an external surface of the stamping head, wherein the dies are individually locatable to oppose the article to be stamped when at least one symbol is selected by the user which corresponds to at least one of said dies, wherein the stamping head is mountable on at least one rotational axis; and
   a heating element disposed within the stamping head, wherein the heating element is rotatable within the stamping head around the at least one rotational axis, wherein the heating element is configured to heat the stamping head to a previously determined operating temperature prior to and during the stamping.

2. The stamping machine of claim 1, wherein the stamping machine is previously calibrated to perform the stamping positioned on the article in the same position and orientation as said displayed symbol superimposed on the image of the article as presented to the user prior to the stamping.

3. The stamping machine of claim 1, further including:
   a work surface disposed in a plane, wherein the article prior to stamping is mountable on said work surface, wherein said work surface is laterally movable in said plane.

4. The stamping machine of claim 1, further including:
   a distance sensor adapted to measure longitudinal distance to a surface of the article prior to or during the stamping.

5. The stamping machine of claim 1, further including:
   a laser mounted on a fixed cross member adapted to project a line onto the article prior to or during stamping.

6. The stamping machine of claim 1, further comprising:
   a work surface disposed in an XY plane, wherein the stamping head is rotatable around a rotational axis parallel to the XY plane to locate the die to oppose the article to be stamped.

7. The stamping machine of claim 1, further comprising:
   a feed mechanism configured to feed a foil between the article and the stamping head.

8. The stamping machine of claim 7, wherein under control of said computer system said foil is embedded to a previously determined depth into a surface of said article.

9. The stamping machine of claim 7, wherein the stamping head is rotatable around a single rotational axis to locate the die to oppose the article to be stamped, and wherein the feed mechanism is configured to feed the foil in a direction parallel to the single rotation axis.

10. A method for stamping an article using a stamping machine including a stamping head, a camera and a computer system, wherein the computer system includes a display, the method including the steps of:
    capturing from the camera an image of the article;
    presenting said image on the display;
    selecting a symbol by a user using the computer system onto the article;
    positioning and orienting said selected symbol as a displayed symbol superimposed on said image of the article on the display; and
    wherein the stamping machine is previously calibrated to perform the stamping positioned and oriented on the article in the same position and orientation as said displayed symbol superimposed on the image of the article as presented to the user;
    wherein the stamping head is mountable on at least one rotational axis, wherein a plurality of dies in relief are disposed on an external surface of the stamping head;
    under control of the computer system, individually locating at least one of the dies to oppose the article to be stamped when at least one symbol selected by the user corresponds to at least one of said dies; and
    internally heating the stamping head to a previously determined operating temperature prior to and during the stamping by a heating element internally disposed within the stamping head and rotatable with the stamping head around the at least one rotational axis.

11. The method of claim 10, further including:
    mounting the article on a work surface disposed in a plane; and
    under control of the computer system, moving the article laterally in said plane.

12. The method of claim 10, further including:
    measuring longitudinal distance to a surface of the article prior to or during the stamping.

13. The method of claim 10, further including:
  feeding a foil between the article and the stamping head; and
  under control of said computer system, performing the stamping by embedding said foil to a previously determined depth into a surface of said article.

14. The method of claim 10,
  rotating the stamping head around a single rotational axis thereby locating the die to oppose the article to be stamped; and
  feed the foil in a direction parallel to the single rotation axis.

15. The method of claim 10, wherein a work surface is disposed in an XY plane, the method further including:
  rotating the stamping head around a rotational axis parallel to the XY plane, thereby locating one of the dies to oppose the article to be stamped.

\* \* \* \* \*